United States Patent
Firsov et al.

(10) Patent No.: US 12,041,180 B2
(45) Date of Patent: Jul. 16, 2024

(54) METHOD AND SYSTEM FOR GENERATING DATA SIGNATURES USING AN UNBOUNDED, STATELESS PRIVATE KEY

(71) Applicant: Guardtime SA, Lausanne (CH)

(72) Inventors: Denis Firsov, Tallinn (EE); Henri Lakk, Tartu (EE)

(73) Assignee: Guardtime SA, Lausanne (CH)

( * ) Notice: Subject to any disclaimer, the term of this patent is extended or adjusted under 35 U.S.C. 154(b) by 396 days.

(21) Appl. No.: 17/668,486

(22) Filed: Feb. 10, 2022

(65) Prior Publication Data

US 2022/0271945 A1   Aug. 25, 2022

Related U.S. Application Data

(60) Provisional application No. 63/147,986, filed on Feb. 10, 2021.

(51) Int. Cl.
*H04L 9/32* (2006.01)
*H04L 9/14* (2006.01)
*H04L 9/30* (2006.01)

(52) U.S. Cl.
CPC ............ *H04L 9/3247* (2013.01); *H04L 9/14* (2013.01); *H04L 9/3073* (2013.01); *H04L 9/3297* (2013.01)

(58) Field of Classification Search
CPC ............................ H04L 9/3247; H04L 9/3297
See application file for complete search history.

(56) References Cited

U.S. PATENT DOCUMENTS

| | | | |
|---|---|---|---|
| 2020/0119928 A1* | 4/2020 | Rubin | H04L 9/3247 |
| 2020/0127849 A1* | 4/2020 | Lakk | H04L 9/50 |
| 2020/0320219 A1* | 10/2020 | Barouch | G06F 21/602 |

* cited by examiner

*Primary Examiner* — David J Pearson
(74) *Attorney, Agent, or Firm* — Jeffrey Pearce

(57) ABSTRACT

Digital signatures are generated for a message using an authentication tree data structure in which nodes are created as needed from a root node. A public and secret key pair is generated using a one-time signature method to form each node, and the secret key of each parent node is used to sign the public keys of its child nodes. Once the secret key of a node has been used in creating a signature for a message, it may be revealed. The signature data structure is unbounded and stateless, and need not be pre-generated and fixed.

6 Claims, 2 Drawing Sheets

METHOD AND SYSTEM FOR GENERATING DATA SIGNATURES USING AN UNBOUNDED, STATELESS PRIVATE KEY

CROSS-REFERENCE TO RELATED APPLICATIONS

This application claims priority of U.S. Provisional Patent Application No. 63/147,986, filed 10 Feb. 2021.

TECHNICAL FIELD

This invention relates to digital data security.

BACKGROUND ART

Now that "data" has become a normal, almost invisible, part of the lives of just about everybody in the industrialized world, focus has for many entities shifted to questions of security and integrity of the data. Central to many known solutions to issues such as security and integrity are digital signatures, that is, digital information that is associated with, and often at least partially derived from, the contents of the data set to be signed, often along with other information such as an indication of the identity of the user/owner.

Different methods may be used to create digital signatures. One common signature scheme uses keys. The well-known Public Key Infrastructure (PKI) is an example of such a system. One problem with PKI-based signature is that PKI keys may be revoked ahead of their initial expiration date; moreover, the associated Certificate Revocation Lists (CRL) and Online Certificate Status Protocol (OCSP) responses must be archived. This problem is multiplied in environments in which there might be an enormous number of "perishable" key pairs associated with the many documents in circulation. Moreover, recent research indicates that some common keys may have "back doors" embedded in them, or may be generated using comprised pseudo-random number seeding routines.

Some known signature solutions are based on hash trees, which must overcome several challenges, such as how to avoid too large signatures, how to keep local state information, and how to ensure a fixed or maximum number of uses.

For example, in Oded Goldreich's "Foundations of Cryptography: Volume 2, Basic Applications", among other documents, Goldreich proposed a signature scheme based on a hash tree. One problem of the Goldreich scheme is that it requires an inefficiently large, fixed, initial hash tree size. Another weakness is that all or at least parts of the private keys of one-time signature (OTS) pairs in Goldreich's nodes must remain secret; otherwise, anyone is able to authenticate new nodes.

The signature scheme known as SPHINCS (see D. J. Bernstein, et al., "SPHINCS: Practical stateless hash-based signatures", EUROCRYPT 2015, Proceedings, Part I, volume 9056 of LNCS, pages 368-397, Springer, 2015) reduces the Goldreich signature size by reducing the tree height, but in order to avoid the catastrophic security failures that would be caused by reuse of its internal, OTS key pair, SPHINCS relies on "fewtime signatures".

Another prominent signature scheme family is XMSS (see J. A. Buchmann, et al., "XMSS—A practical forward secure signature scheme based on minimal security assumptions", PQCrypto 2011, Proceedings, volume 7071 of LNCS, pages 117-129, Springer, 2011) that is based on Merkle signatures. XMSS can produce smaller signatures than SPHINCS, but the signer is still required to keep an internal state (the private key needs to be updated after every use).

One problem arises in any stateful system such as XMSS, namely, that it cannot be run from two devices in parallel; this limitation also applies to backup copies or restored states from backups, especially when backups can be made.

In Merkle R. C., "A Digital Signature Based on a Conventional Encryption Function", Pomerance C. (eds) Advances in Cryptology—CRYPTO '87, CRYPTO 1987, (1988). Lecture Notes in Computer Science, vol 293, Springer, Berlin, Merkle proposed a mechanism for creating an infinite private key using one-time signatures. The idea was to create a tree of one-time signatures that authenticates its child nodes and also contains a signing key. Although the nodes in this system can be generated using a pseudo-random function, one still must keep track of which signing keys have been used, that is, one must store a local state.

Guardtime AS of Tallinn, Estonia, has also proposed different versions of a signature scheme known in its literature as "BLT", after the initials of the primary inventors Buldas, Laanoja, and Truu. Two BLT variants are the time-bound BLT (BLT-TB) and the one-time BLT (BLT-OT), which produce significantly smaller signature and timestamp pairs ($\sigma$, $\tau$) than other existing hash-based signature schemes combined with timestamping.

There are several problems with these existing schemes, however. First, the BLT-TB variant is stateless and produces smaller signatures, but is wasteful and the key generation process is slow. Without using any caching of the internal Merkle tree that BLT-TB uses, signing is also relatively slow. Moreover, this scheme does not explicitly deal with delays in the timestamping process where the resulting timestamp value may not be the one expected. This can be overcome by sending multiple requests at the time, but this means the signing process needs even more resources.

The BLT-OT version produces larger signatures than BLT-TB, but key generation is faster. This is achieved, however, by introducing a state. This means the scheme can be used primarily on devices that are not backed up and that do not support parallel signing, such as is possible using Hardware Security Modules (HSM's) and smart cards like the Estonian ID card. This scheme does not require the signer to estimate the timestamping time. Both of these BLT schemes, however, have a limitation that the generated keys are bound. The use of a BLT-TB private key is bound to a predetermined number of time slots (e.g., seconds) such that once they run out, the private key is no longer usable. Similarly, the BLT-OT key is bound to a predetermined number of signatures a private key can produce; once they have been used, there is no way to add more and a new key pair must be created.

DETAILED DESCRIPTION

Disclosed here are different embodiments of a many-time signature scheme, which leverages one-time signature schemes, and which generates digital data signatures using public key authentication methods and time-stamping. The embodiments are unbounded, and use a private (secret) key that is stateless. When using hash-based authentication methods, the embodiments produce smaller signatures compared to other hash-based signature schemes such as SPHINCS.

Figure 1:
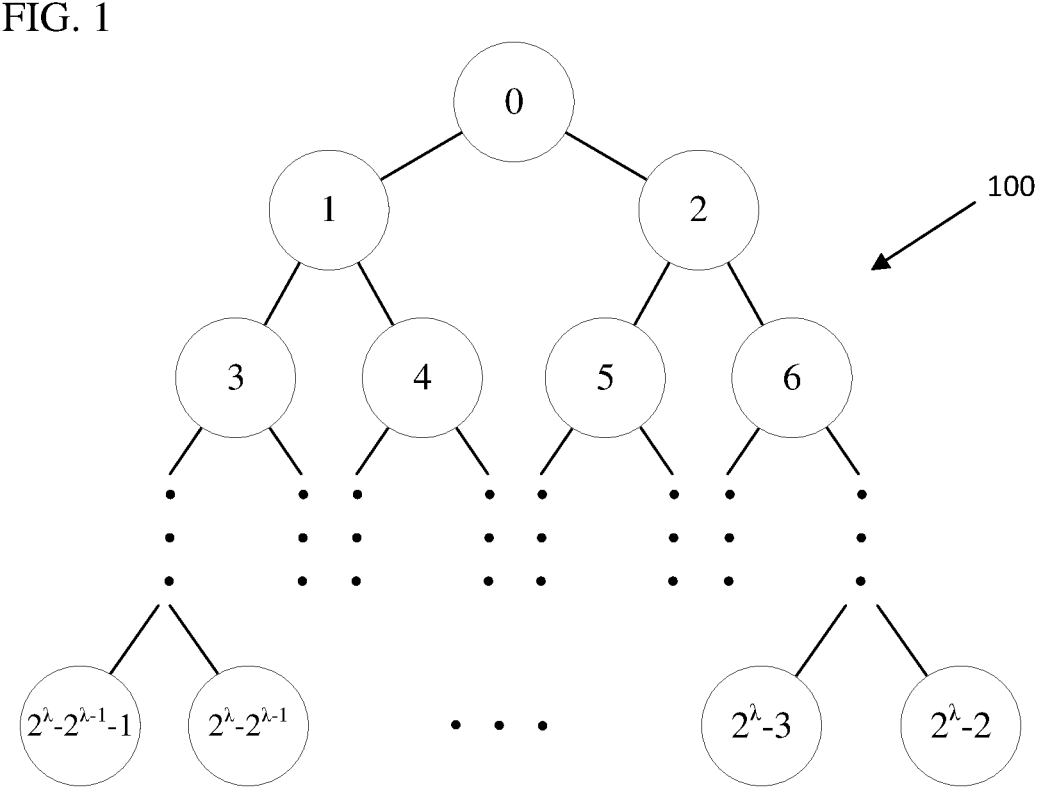
FIG. 1 illustrates a generally "downward-growing" tree data structure and the relationship between parent, child, and sibling nodes, in which each node is associated with a time value.
Figure 2:
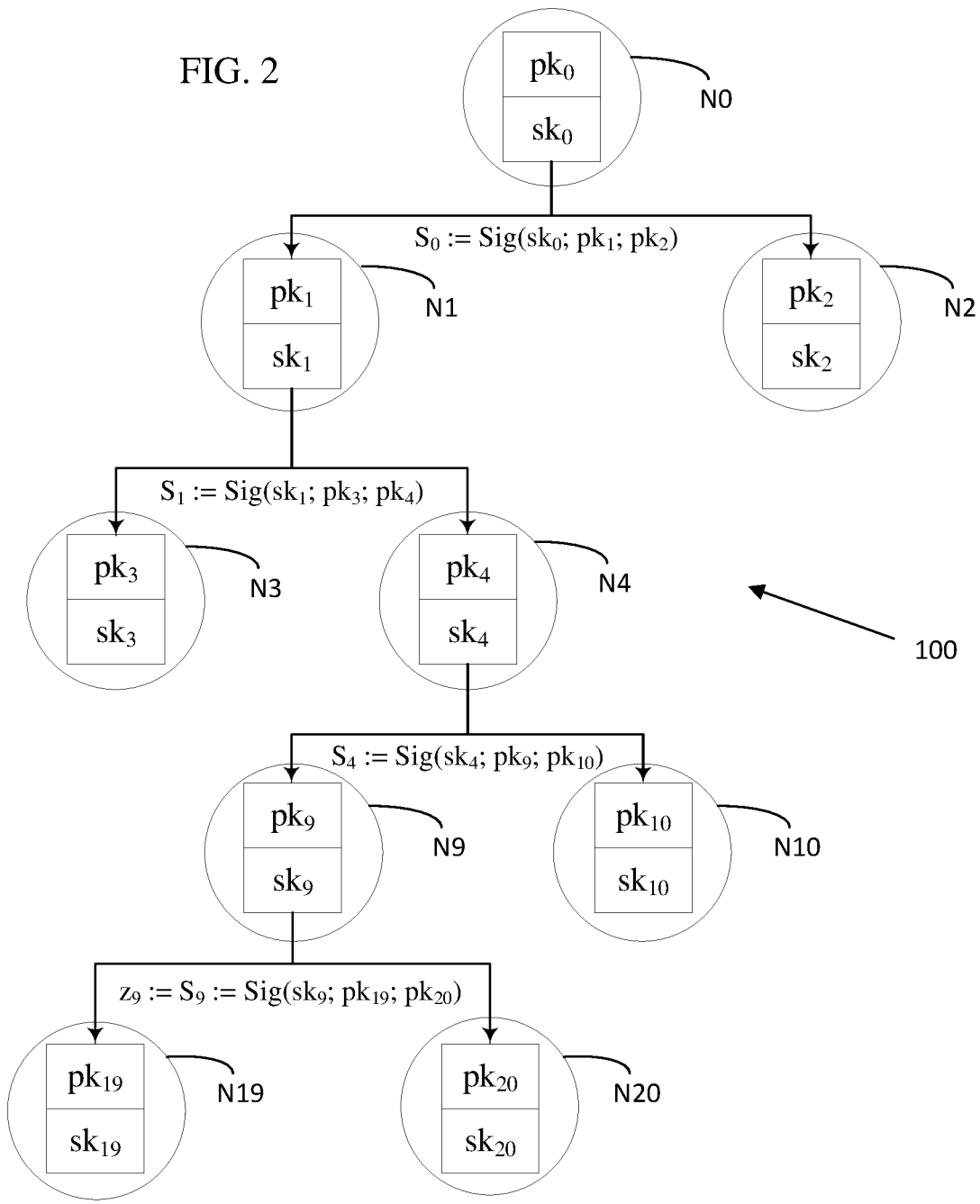
FIG. 2 illustrates the structure of the tree data structure used in some embodiments of the invention, as well as how keys are generated.

Initially, the general structure and signature method are described, with reference to FIGS. 1 and 2. An example is described in conjunction with this general description. Thereafter, the specifics of two different embodiments are described, along with pseudo-code to better illustrate and explain the authentication and verification methods used in the two main embodiments.

As used here, "stateless" means that it is not necessary to maintain information about a signing key once it has been used; thus, no local information about keys needs to me maintained, even though the global "state" of time is used.

Although the embodiments described and illustrated below use hash-based authentication mechanisms, this is by way of example only. Cryptographic hash functions have known security advantages such as collision resistance and pre-image resistance, but any authentication mechanism with these properties could be used instead.

Moreover, there is no assumption that the internal signatures have to be one-time, although this option is use by way of example. Furthermore, although the tree data structure is described below in terms of it being binary, this is also not necessary. Thus, although one proposed prototype used a Winternitz hash-based one-time signature scheme with the internal structure arranged as a binary tree, this was simply a non-limiting design choice for the sake of investigation.

Some embodiments use a structure that at least superficially resembles the Goldreich authentication tree (see reference above) in which every node authenticates its child nodes. "Resembles" does not, however, imply "is equivalent to": Unlike in Goldreich, the size of the authentication tree in embodiments of our invention is not fixed at some large initial size, but rather may "grow" as needed, theoretically without bound, to accommodate the actual need for nodes. This not only reduces the storage requirement of the structure, but also allows for minimum path lengths from all populated nodes to the root, since there is no need to compute values through layers of "empty" nodes.

As such, in a computing system that is arranged to receive and generate digital signatures for data, that is, "messages", this invention provides a method to reduce the storage requirement in the system. As will be seen below, it does this in two primary ways: First, as just mentioned, the tree data structure used in signature generation grows only "as needed", and does not have to be computed and stored in advance to ensure that enough signatures can be generated, and it is also not necessary to generate "empty" tree nodes. Second, because the different embodiments of the signature method are stateless (except inasmuch as time is considered to be "state"), state information also does not need to be stored.

Furthermore, the authentication structure used in embodiments of our invention does not have to be a tree at all, although it is described here as such for the purpose of illustration. Other linked data structures may be used instead, with modification, if needed at all, that will be within the skill of programmers in the field of data security. A "tree" should therefore be understood to include any data structure that provides the same linkage between higher-level nodes ("parents") and their immediately lower-level nodes ("children") as described below for the computation tree 100. Note that, in general, even hash "trees" are typically stored using a linked data structure, with appropriate pointers, that represents a tree only logically.

In embodiments of this invention, an authentication tree (or other data structure) is built starting from a root node N0 "down" as opposed to a Merkle tree that is built from leaves "up" to the top. The nodes (N0, N1, N2, . . . , Ni) in the authentication tree contain a key pair ($pk_i$, $sk_i$), that is used to sign the public keys of its child nodes. In embodiments, it is therefore not necessary to construct, a priori, a "full" tree, with $2^{n-1}$ nodes in tree generation (level) n (with the root node at level 1); rather, only the nodes and signatures of the public keys of the child nodes that are actually needed are calculated. Although many nodes (e.g. in the upper layers near the root) may be generated and signed more than once, this does not prohibit the use of one-time signatures if desired, since the keys may be used to sign the same message, that is, for example, a concatenation of the deterministically generated public keys of the child nodes). Embodiments thus may use all of the tree nodes in the signing process instead of just using leaf nodes, which allows the main data structure of the invention in practice to grow indefinitely.

In general, embodiments of this invention build on the idea of a secret value $z_t$ that can be used to sign a document only at time t, that is, in a time period uniquely associated with and identified by a time value t. After $z_t$ is selected, the combination of the key and the data set to be signed, that is, the "message" m (e.g., hash(m, $z_t$, other)) is then time-stamped, where other may be any other data or metadata a user may wish to have signed along with the message m itself. (Of course, the message m may, and typically will, be defined to comprise all information that is to be signed, and will thus itself include all "other" information.)

After time t the secret value $z_t$ can be used only to verify existing signatures, assuming an attacker is unable to back-date the timestamp. Unlike in other schemes with a time-bound secret key, however, the key $z_t$ is selected in a unique way, and may then be authenticated with a single public key.

FIG. 1 illustrates the general structure of a tree 100 that may be used in embodiments. Every node (shown as respective circles with time values shown within) in the tree is associated with a time value t, where the root (Node 0) is t=0. The "children" nodes (Node 1 and Node 2) in the illustrated example are at times t=1 and t=2 and so forth. Although any numbering scheme may be used, the one illustrated makes it easy to calculate the index of the parent and child nodes at any level A. If one assume the root Node 0 to be at level or "layer" $\lambda=1$, then, for $\lambda>1$, the nodes will have time values $$(2^\lambda - 2^{\lambda-1} - 1), (2^\lambda - 2^{\lambda-1}), \ldots, (2^\lambda - 3), (2^\lambda - 2).$$

Although an option, note that t is not necessarily synchronized with a particular unit, such that it increments every second (or other unit). In other words, although t is determined by some time base (including any strictly increasing sequence of numbers generated in any known and secure manner), the time between two consecutive time values t need not be constant (although this is, again, an option). In even other words, nodes need not be generated if there is no need for them yet. The time t can therefore indicate a slot, that is, period of physical or logical time. One advantage of using physical time to mark the creation of nodes and associated signatures is that one can then use any of the known timestamping services, some of which are mentioned below.

The public key PK of the entire tree (the "global" or "common" public key) is the public key of the root node (Node 0) and the secret key SK in this embodiment is an unpredictable value that is used to calculate any given key pair in the tree $(s_{kt}, p_{kt}) := g_{sk}(t)$. Unlike in the Goldreich signature scheme (and therefore also SPHINCS), in embodiments of this invention, the height of the tree is unbounded, that is, not fixed a priori and every node in the tree can be used to sign a message, such as a document or any other data set. Indeed, in embodiments of this invention, there are no "leaf" nodes at all, since the tree is constructed downward from a root instead of upward from leaf values to a root. One advantageous consequence of this is that the tree in this invention can theoretically grow to any arbitrary size, although this will in practice typically be limited by the bit length of the chosen time base. For example, if 32-bit POSIX time is used as the time base, then the practical binary tree height will be 31. The definition of "unbounded" is therefore to be understood to include the practical limitation of "to the extent allowed by the representation of the chosen time base".

FIG. 2 illustrates an example of such a tree that is a binary tree where every node (including the root node N0) is represented by an OTS key pair. Any known method may be used to generate these key pairs, such as the Lamport or Winternitz schemes.

In the embodiment illustrated in FIG. 2, the signature value $S_t$ is the secret value $z_t$ for time t and is given by:

$$z_t = S_t = Sig(sk_t; pk_{2t+1}, pk_{2t+2})$$

This signature value $S_t$ may not be revealed before time t, but after time t it becomes a part of the public authentication path for all of the node's child nodes. The value $S_t$ is then combined (for example, concatenated and hashed) with the message being signed and timestamped at time t.

Consider the signature for time t=9. This signature is preferably comprised of the following values:
1. A timestamp $TS_9$ at time t=9 of the value $f(m, S_9)$, where cryptographic function $f$ combines the two values (for example, hashes the concatenated value of the two parameters, or a HMAC value where $S_9$ is the key, etc.).
2. The signature value $S_9$
3. The public key $pk_9$ to authenticate $S_9$
4. The signature value $S_4$ (of the parent node N4) and public key $pk_{10}$ (of the sibling node N10) to authenticate the public key $pk_9$
5. The public key $pk_4$ to authenticate $S_4$
6. The public key $pk_3$ and $S_1$ to authenticate the public key $pk_4$
7. The public key $pk_1$ to authenticate $S_1$
8. The signature value $S_0$ and public key $pk_2$ to authenticate the public key $pk_1$
9. Optionally, the public key of the entire tree $PK=pk_0$ As steps 5-9 indicate, the signature preferably includes the public keys and signature values upwards from the current node to at least its "oldest non-root ancestor" (in the example, N1) and the public keys of the siblings of each of the "ancestor nodes" in the path to the tree root, and, optionally the root node itself. This enables authentication from any signature value to the root. Working iteratively upward from the current node (for which the timestamp is obtained in conjunction with the current signature), the main "loop" of this procedure is thus:
1) use the public key of the current node to authenticate the current signature value;
2) use the signature value of the immediate parent node and the public key of the immediate sibling node (in the same layer, that is, "generation") to authenticate the public key of the current node; and
3) set the parent node to be the "current node" and repeat 1) and 2) up to at least the oldest non-root layer, and augment with the public key of the root node if desired.

General Construction

As mentioned above, the authentication tree does not have to be binary—the shape of the data structure thus need not be fixed. As just some of the other alternatives, the data structure from which the signatures are generated could instead be implemented as a chain of nodes (unary tree), or k-ary tree or even as a directed graph.

The internal authentication methods in the tree are not just limited to one-time signatures. The nodes could be implemented, for example, using any signature mechanism or even Merkle trees. When using Merkle trees, the hash value of a Merkle tree node may then be used as the public key and the child nodes may be considered as a limited authentication token. Such an optimization would replace a complex signature (for example, a Winternitz signature) with only two hash values, thus reducing the overall signature size of the scheme. To keep the unbounded property, the Merkle tree optimization should preferably be combined using other authentication methods, such as by using Merkle trees of a fixed height).

Note, however, two important advantages our invention has over Merkle tree-based schemes, including those using what is known as the "infinite" Merkle tree. First, because our invention uses only time as the state, the private key does not need to be updated. Second, whereas Merkle used each node to authenticate two children and a key-pair for actual signing, our invention needs only the node value (value of the public key) for signing and after this node has expired it can be used to verify the signature; this in turn means that the invention we can optimize where the Merkle infinite signature scheme cannot.

It is not necessary for every node in the tree to be created using the same authentication method as long as the algorithm selection is deterministic. For example, every node with an even index might use one method and every node with an uneven index might use another method, different methods might be used for different tree levels, etc.

The following pseudo-code for function AuthNode(i) and function SignChildren(i) shows how the authentication tree may be calculated for a node with index i, that is, generated according to the illustrated function AuthNode(i). In this disclosure, two main embodiments are described—an "Unbounded" and a "Public Tree" embodiment—, in which the second uses a modification of the first; accordingly, the description of the routines is "split" in two, such that a different version of the signChildren(i) is described after the first.

function AuthNode(i)
  S ← 0
  P ← 0

-continued

```
   while i > 0 do
      parentIx ← ⌊(i − 2)/2⌋
      (P', S') ← SignChildren(parentIx)
      (P, S) ← (P ∪ P', S ∪ S')
      i ← parentIx
   end while
   (pk_0, •) ← Gen_OTS(0)
   return (P ∪ {pk_0}, S)
function SignChildren(i)
   (pk_{2i+1}, •) ← Gen_OTS(2i + 1)
   (pk_{2i+2}, •) ← Gen_OTS(2i + 2)
   (pk_i, sk_i) ← Gen_OTS(i)
   P ← {pk_{2i+1}, pk_{2i+2}}
   leftChild = pk_{2i+1}
   rightChild = pk_{2i+2}
   s ← SIGN_OTS(sk_i, leftChild | rightChild)
   S ← {s}
   return (P, S)
end function
``` where:

SIGN$_{OTS}$ indicates any chosen function that returns a one-time signature of its input parameter(s)

leftChild and rightChild refer to the nodes, in particular, the public keys, at the next higher level (that is, one level farther removed from the root) of the tree that have the current node as a parent, on the left and right, respectively, viewed as in FIG. 1. (Of course, the tree or other data structure could just as well be ordered "right to left" by appropriate modification of indexes, which skilled programmers will readily understand how to do.) As mentioned before, the tree need not be strictly binary, that is, with exactly two children for each parent node, but could instead be an n-ary tree (n>2) with modifications to the disclosed routines that will be understandable to skilled programmers. Use of a binary tree typically simplifies computational "bookkeeping", however.

∪ indicates "union"

| indicates concatenation (As long as the order of parameters is kept consistent in the routines, a different order than the one shown here may be used.)

⌊•⌋ indicates the "floor" function

In order to optimize the signature size, embodiments may combine the authentication tree with Merkle trees in a way that also uses the internal nodes of the tree.

Both of the embodiments below associate time values with every node in the tree based on their index in the tree. One example of such an association is simply that the index of the node is the time value indicating when this node can be used, measured either using physical or network clock time, or as a system time from some chosen genesis time. The nodes are preferably indexed from the root, where the root has the index 0 (or any other time value suitable for the particular implementation) and left and right sibling nodes in the binary tree (if chosen to be binary) will have values 2i+1 and 2i+2, respectively, for some positive integer i.

Internal Signatures

As the function Gen$_{OTS}$ indicates, embodiments use a signature scheme—an "internal" signature—within the broader signature scheme as expressed in the AuthNode(i) and SignChildren(i) subroutines. This internal signature scheme may be any stateless signature scheme the system designer prefers that is capable of signing the same message many times without loss of security. In a preferred embodiment, this internal signature routine generates one-time signatures (OTS's); hence, the function designation Gen$_{OTS}$.

Many known OTS schemes are suitable, some examples of which include Lamport, Winternitz, WOTS+, and the above-mentioned BLT-TB schemes. Note that the concept of "one-time" may in some schemes not be absolute, but rather mean "one time per specified signature period".

Although the description above discloses the general principles of the invention, two embodiments will now be described in greater detail to provide more in-depth understanding of how the invention works. These two embodiments are referred to as the basic "Unbounded Embodiment", which corresponds to the embodiment described above, and the "Public Tree Embodiment". One should keep in mind, however, that even the Public Tree Embodiment is unbounded.

Broadly, the Unbounded Embodiment provides a signature scheme with a stateless private key (the root of the authentication tree 100) that can sign an arbitrary number of messages for an arbitrary number of time-slots. The Public Tree Embodiment additionally provides compensation for timestamping service lag, such that the signer estimates the time value but the embodiment includes an internal mechanism for dealing with short delays. The delay length is selectable, but predetermined while creating the private key. Theoretically, the Public Tree Embodiment can produce smaller signatures than the basic Unbounded Embodiment, as its authentication tree height is shorter by one set of public keys and OTS signatures.

Unbounded Embodiment

This embodiment uses the OTS signature value of a particular node as the secret value, which is hashed together with the message. The result is then timestamped. The authentication tree then associates the signature via the public key of the node with the public key of the root node of the authentication tree. As the following pseudocode for function SignUnboundedBLT(m, t) describes, in order to sign a message m at time t the public and secret keys pk$_t$ and sk$_t$ are calculated. Then the public keys of the corresponding child nodes (pk$_{2t+1}$ and pk$_{2t+2}$) are signed using sk$_t$. The signature value s is hashed together with the message m and the resulting hash value x is sent for timestamping.

If the time-stamping service returns a time value that is not equal to time t the signing process fails and ⊥ (indicating "invalid result") is returned; otherwise, the authentication information and the timestamp TS are returned as the signature (P, S, TS). Given this signature and the message, a verifier can recreate the value x, verify the timestamp TS and check the authentication chain up until reaching the public key pk$_0$. Note that one may also view the values S and P as the values created by authenticating either the public key pk$_{2t+1}$ or pk$_{2t+2}$, but as the signature value is also needed the authentication of the last layer is done explicitly here.

The procedure just described may also be expressed more programmatically by the following pseudocode:

```
function SignUnboundedBLT(m, t)
   P ← ∅
   S ← ∅
   (P, S) ← AuthNode(t)
   (pkt, skt) ← Gen_OTS(time)
   (pk_{leftChIx}, •) ← Gen_OTS(2t + 1)
   (pk_{rightChIx}, •) ← Gen_OTS(2t + 2)
   s ← Sign_OTS(sk_t, pk_{leftChIx} | pk_{rightChIx})
   S ← S ∪ s
   P ← P ∪ {pk_{leftChIx}, pk_{rightChIx}}
   x ← hash(m, s)
   TS ← TIMESTAMP(x)
   if TS.time ≠ time then
```

-continued

```
    return ⊥
  end if
  return (P, S, TS)
end function
```

Public Tree Embodiment

This embodiment is also based on the authentication tree, but differs from the Unbounded embodiment in that the whole tree can be made public, including the signatures. In an extreme case the whole tree could thus be represented as a table that forms the public key, although this would be inefficient. Instead, in this embodiment, additional data (which may be empty) is added to every node. In this embodiment, not only are the public keys of the child nodes authenticated, but also the hash values of the public keys and the additional data as well. In this embodiment, to use the AuthNode(i) function defined above, the SignChildren(i) function is modified by adding the data value $d_i$ to the corresponding child public key value and calculate the hash of it. This modified SignChildren(i) function will therefore operate as defined in the following pseudocode:

```
function SignChildren(i)
    (pk_{2i+1}, •) ← Gen_{OTS}(2i + 1)
    (pk_{2i+2}, •) ← Gen_{OTS}(2i + 2)
    (pk_i, sk_i) ← Gen_{OTS}(i)
    P ← {pk_{2i+1}, pk_{2i+2}}
    leftChild = hash(d_{2i+1} | pk_{2i+1})
    rightChild = hash(d_{2i+1} | pk_{2i+2})
    s ← Sign_{OTS}(sk_i, leftChild | rightChild)
    S ← {s}
    return (P, S)
end function
```

The data value $d_i$=hash($y_{i,0}$, $y_{i,1}$, ... $y_{i,n}$) is a hash value of n+1 values where $y_{i,k}$=hash($z_{i,k}$) for every 0≤k≤n, where the value n≥0 is the maximal allowed number of time units of lag time between signing and timestamping, where n=0 means no lag time is accepted. This part of this embodiment thus operates as an endorsement scheme. Let $Gen_E(t)$ be the routine that generates the z values, using any known method; for example, $Gen_E(t)$ may be any known pseudo-random function.

This signing process combines the message m and all of the y values, for example, by hashing them. The resulting value x is then timestamped. When the timestamp time value TS is returned, the routine computes the difference δ between the expected time value and the actual one. If the difference is less or equal to n then the signature process returns all of the authentication public keys (P, the authentication tree internal OTS signatures S, the timestamp TS) on value x, which can be calculated using message m and the y values. To endorse the time difference the pre-image $z_{t,\delta}$=hash($y_t$, δ) is revealed instead of $y_t$, δ, which means the verifier has to hash that particular value before calculating x. The procedure just described may be expressed by the following pseudocode:

```
function SignBLTFL(m, t)
    P ← ∅
    S ← ∅
    (P, S) ← AuthNode(t)
    (z_{t,0}, ... , z_{t,n}) ← Gen_E(t)
    (y_{t,0}, ... , y_{t,n}) ← (hash(z_{t,0}), ... , hash(z_{t,n}))
    x ← hash(m | y_{t,0}, ... , y_{t,n})
```

-continued

```
    TS ← TIMESTAMP(x)
    δ = TS.time − t
    if δ > n ∨ δ < 0 then
      return ⊥
    end if
    return (P, S, TS, y_{t,0}, ... , z_{t,\delta}, ... , y_{t,n})
end function
```

The Public Tree Embodiment of the invention offers some advantages as compared with the basic Unbounded Embodiment. These include:
  The authentication tree structure can be made public without loss of security. Note that, in implementations in which is the authentication tree is of the Goldreich type as opposed to a Merkle tree, the private keys of the OTS key pairs in the nodes still need to remain secret to prevent unauthorized authentication of new nodes. This means, however, that it would be possible to use a data structure other than a tree. For example, it would be possible to pre-calculate a time-bound value for every time unit and publish these values as a table.
  The Public Tree Embodiment intrinsically addresses the timestamping lag problem. At the time of sending a value for timestamping, the actual returned time of the timestamp is not guaranteed to be the value expected due to network latency.
  A single secret key may be used safely on multiple devices. This is an issue in particular when an attacker can skew time—two devices send a timestamping request at the same time but the attacker can control the response lag time. This embodiment thus addresses both the lag and multiple device problems simultaneously.

Timestamping

There are many known timestamping services that may be used in this invention. Just two of many options that may be used in embodiments include using the known RFC 3161 Time Stamp Server, or a time-synchronized, blockchain-based arrangement such as Bitcoin or some other blockchain, or any other timestamping service that users trust and has the required precision.

Nonetheless, because of its advantages the Guardtime's KSI® system is summarized here in the context of timestamping. The KSI system is a hash tree-based signing infrastructure provided by Guardtime AS of Tallinn, Estonia, which is disclosed in U.S. Pat. No. 8,719,576 (also Buldas, et al., "Document verification with distributed calendar infrastructure") and is marketed under the registered trademark "KSI". This Guardtime signature infrastructure (and any subsequent improvements to it) is referred to below as the "KSI system".

In general, the KSI system inputs digital data sets in aggregation rounds and then, along with other metadata as desired, aggregates these inputs by using them as leaves to a hash tree whose root value for the round forms a current entry in a data structure referred to as a "calendar", which encodes the calendar values of previous rounds as well. The calendar is thus a form of blockchain inasmuch as information of previous entries is linked cryptographically with a current value. In some cases, the calendar may be configured as a typical linear blockchain. In other cases, preferred cases, each calendar value is itself forms a current leaf in a progressive hash tree, whose root value, either after each round or after a predetermined number of rounds, is represented as a "publication value" in some immutable, irrefutable medium such as a physical or electronic publication or some other data structure that system participants accept as irrefutable. The KSI system then returns, for each input, a digital signature that comprises a vector of its sibling values up through the hash tree to the calendar value of the respective round, and, by extension, optionally to the publication value when it becomes available. Since the KSI system itself synchronizes the calendar with a system time, the KSI system's signatures themselves are also provably bound to a time value and thus may be used as a timestamp.

The invention claimed is:

1. A method for generating a digital signature for a message, comprising:
    computing parameters of nodes of an authentication tree data structure progressively from a root node, the height of the authentication tree data structure being unbounded and non-fixed a priori, in which
        each node comprises a one-time public/secret key pair, in which the public key ($pk_0$) of the root node forms a stateless global public key for the authentication tree data structure;
        each node is associated with a respective time value;
    for a current time period corresponding to a respective one of the time values:
        generating the public and the secret keys of a current node using an internal stateless one-time signature (OTS) function of the time value associated with the parent node;
        generating the public key of each of a plurality of child nodes of the current node by applying the internal stateless one-time signature functions of the time values associated with the respective child nodes;
        forming a signature value as a second one-time signature function of the secret key of the current node and the child values of the child nodes;
        computing a cryptographic function of the message and the signature value;
        creating the digital signature for the message to include:
            a value corresponding to the cryptographic function;
            the signature value;
            and, iteratively, until the root node is reached:
                a function of the public key of the current node, whereby the signature value is authenticatable; and
                a signature value of a parent node of the current node and a function of the public key of a sibling node of the current node, whereby public key of the current node is authenticatable, said iteration then being carried out with the parent node taken as the current node.

2. The method of claim 1, in which the value corresponding to the cryptographic function is a timestamp value.

3. The method of claim 2, further comprising returning the digital signature only when the corresponds to the time period with which the current node is associated.

4. The method of claim 1, in which:
    the child values of the child nodes are the respective public keys of the child nodes; and
    the function of the public key of the current node and the function of the public key of the sibling node are, respectively, the public keys of the current and sibling nodes themselves.

5. The method of claim 1, further comprising:
    for each child node, computing a respective additional data value;
    computing the function of the public key of the current node by hashing the public key of the current node together with the current node's additional data value; and
    computing the function of the public key of the sibling node by hashing the public key of the sibling node together with the sibling node's additional data value.

6. The method of claim 5, further comprising:
    computing a series of time-dependent secret values;
    computing a set of k hash values of the secret values, where $0 \leq k \leq n$, and n is a maximal allowed number of time units of lag time between a signing time and a timestamping time;
    computing each additional data value by hashing together the set of k hash values of the secret values;
    computing a timestamp value by timestamping a hash value of the message and the hash values of the secret values;
    determining a difference between an expected time value and an actual signing time; and
    returning the digital signature for the message only when the difference is at least zero and is less than n.

* * * * *